(12) United States Patent
Kowatari et al.

(10) Patent No.: US 10,506,179 B2
(45) Date of Patent: Dec. 10, 2019

(54) SURROUNDING MONITORING DEVICE FOR SLEWING-TYPE WORK MACHINE

(71) Applicant: Hitachi Construction Machinery Co., Ltd., Tokyo (JP)

(72) Inventors: Yoichi Kowatari, Tsuchiura (JP); Hidefumi Ishimoto, Tsuchiura (JP); Yoshihiro Inanobe, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 16/057,900

(22) Filed: Aug. 8, 2018

(65) Prior Publication Data

US 2019/0037148 A1 Jan. 31, 2019

Related U.S. Application Data

(63) Continuation of application No. 14/766,596, filed as application No. PCT/JP2014/052942 on Feb. 7, 2014, now abandoned.

(30) Foreign Application Priority Data

Feb. 8, 2013 (JP) ................................ 2013-023720

(51) Int. Cl.
*H04N 5/265* (2006.01)
*B60R 1/00* (2006.01)
(Continued)

(52) U.S. Cl.
CPC ............... *H04N 5/265* (2013.01); *B60R 1/00* (2013.01); *E02F 9/261* (2013.01);
(Continued)

(58) Field of Classification Search
CPC ...................................................... B60R 1/00
See application file for complete search history.

(56) References Cited

U.S. PATENT DOCUMENTS

| 6,169,948 B1* | 1/2001 | Fujishima | ............... E02F 3/435 |
| | | | 701/50 |
| 6,539,294 B1* | 3/2003 | Kageyama | ............... E02F 3/842 |
| | | | 180/168 |
| 2012/0177470 A1* | 7/2012 | Ohhigashi | ............. E02F 9/2075 |
| | | | 414/687 |

FOREIGN PATENT DOCUMENTS

| EP | 2 631 374 A1 | 8/2013 | |
| EP | 2631374 A1 * | 8/2013 | ............... E02F 9/24 |

(Continued)

OTHER PUBLICATIONS

International Search Report of PCT/JP2014/052942 dated May 13, 2014.

*Primary Examiner* — Rowina J Cattungal
(74) *Attorney, Agent, or Firm* — Mattingly & Malur, PC

(57) ABSTRACT

A slewing-type hydraulic excavator has a plurality of cameras 13 for respectively imaging toward different directions. A view point converting section 21 performs coordinate image data conversion to create overhead view images to look down from an upper position. A composite overhead view image creating section 22 creates a composite overhead view image P arranged around a graphic image of the hydraulic excavator 1. An interference scope indicating section 25 indicates the scope of potential interference on the overhead view image with a surrounding obstacle at respective ground heights at the time of rotating the hydraulic excavator 1. A display image creating section 26 produces the composite overhead view image P together with interference scope which is displayed on a monitor.

8 Claims, 16 Drawing Sheets

(51) Int. Cl.
*H04N 7/18* (2006.01)
*E02F 9/26* (2006.01)
*H04N 5/232* (2006.01)
*H04N 5/44* (2011.01)

(52) U.S. Cl.
CPC ........... *H04N 5/23293* (2013.01); *H04N 5/44* (2013.01); *H04N 7/18* (2013.01); *H04N 7/181* (2013.01); *B60R 2300/306* (2013.01); *B60R 2300/607* (2013.01)

(56) References Cited

FOREIGN PATENT DOCUMENTS

| | | | |
|---|---|---|---|
| JP | 2005-188160 A | | 7/2005 |
| JP | 2008-095307 A | | 4/2008 |
| JP | 2010-053588 A | | 3/2010 |
| JP | 2010053588 A | * | 3/2010 |
| JP | 2010-117882 A | | 5/2010 |
| JP | 2010-148058 A | | 7/2010 |
| JP | 2012-036645 A | | 2/2012 |
| JP | 2012036645 A | * | 2/2012 |
| JP | 2012-074929 A | | 4/2012 |
| JP | 2012074929 A | * | 4/2012 ............. H04N 7/181 |
| JP | 2012-174929 A | | 9/2012 |
| WO | 2012/053105 A1 | | 4/2012 |

* cited by examiner

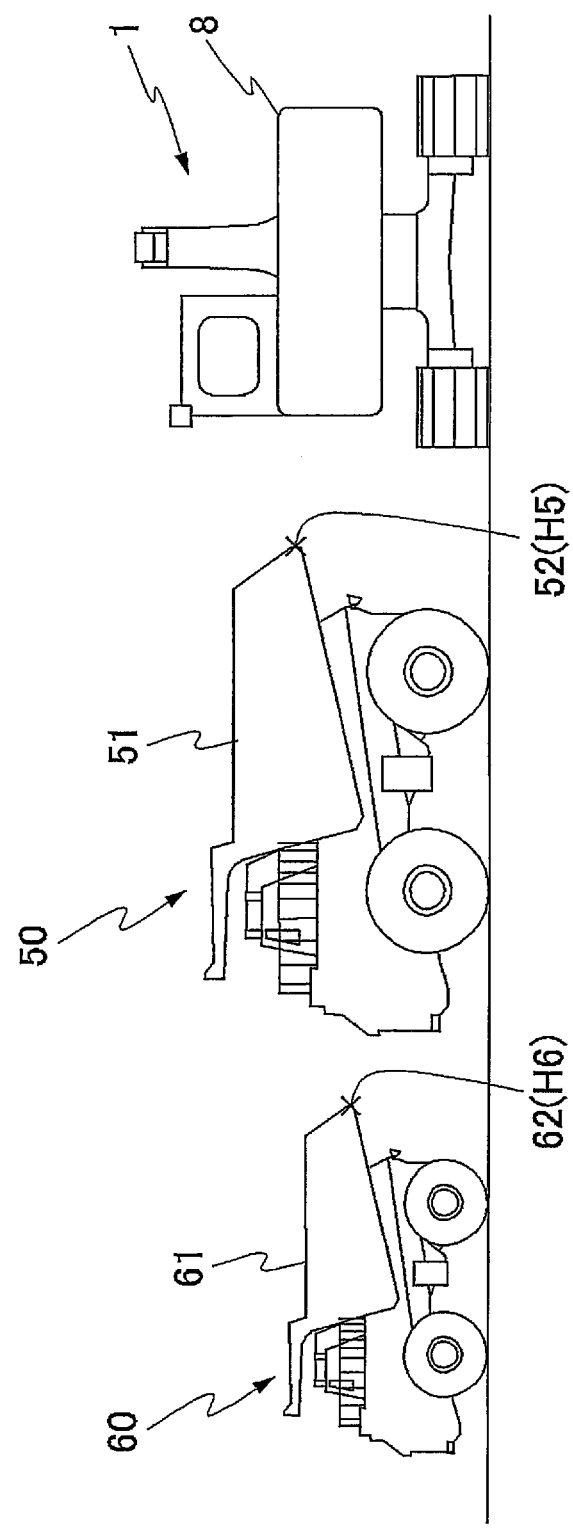

SURROUNDING MONITORING DEVICE FOR SLEWING-TYPE WORK MACHINE

FIELD OF THE INVENTION

The present invention relates to a slewing-type work machine adapted to sustain security for surrounding of the slewing-type work machine, such as a hydraulic excavator or the like.

DESCRIPTION OF THE BACKGROUND ART

A hydraulic excavator is a kind of a slewing-type work machine. Generally, the hydraulic excavator consists of a lower travelling mechanism and a upper swiveling mechanism which are connected by a slewing apparatus, the upper swiveling mechanism being adapted to rotate with respect to the lower travelling mechanism. A front working member is provided on the upper swiveling mechanism, the working member being consisted of a boom, an arm and a front attachment. The front attachment is mainly a bucket to be connected to the arm.

Soil and sand excavated by the hydraulic excavator are loaded on a vessel of a dump truck. For this purpose, a dump truck waits at a position which is apart a predetermined distance from the hydraulic excavator, excavated soil and sand being loaded from the hydraulic excavator on the vessel of the dump truck. The hydraulic excavator performs repeatedly the excavation of soil and sand, and loading them on the vessel of the dump truck. The slewing apparatus is mounted to carry out the repeated performance of the hydraulic excavator.

The hydraulic excavator executes swiveling action so that it is necessary to ensure safety of surroundings. That is, the hydraulic excavator is necessary to pay attention not to contact with some obstacle at a time of swiveling action of the hydraulic excavator. For example, when the hydraulic excavator makes swiveling action in such a situation that the dump truck is extremely approached to the hydraulic excavator, a counterweight of the hydraulic excavator being brought into contact with the dump truck. An operator who operates the hydraulic excavator cannot find visually as to whether or not the counterweight causes interference, due to the counterweight is positioned rearward direction of an operator's cab.

Dead angle zone comes into existence specifically to the backward direction for an operator who is boarded in an operator's cab, and also dead angle is produced for left side and right side direction, further also is formed dead angle to the front side thereof. For this purpose, a patent document 1 discloses a technology that plural cameras are mounted on a hydraulic excavator for displaying an overhead view image by means of signal process of the images taken from the cameras. In accordance with this technology, virtual image of overhead view from upper position to downwardly can be displayed by performing coordinate transformation of images taken by the cameras, the surrounding situation can be recognized by the operator in the manner of high visibility. Especially, under the situation that any obstacle is placed at a closed position from the hydraulic excavator, it is extremely important technology to make intuitively recognition for the operator as to the distance between the hydraulic excavator and the obstacle.

PRIOR ART DOCUMENT

Patent Document

Patent Publication JP 2012-174929 A1

SUMMARY OF THE INVENTION

Problem to be Solved by the Invention

The operator can understand the surrounding situation of the hydraulic excavator intuitively by displaying overhead view image in accordance with the patent document 1. It is useful to specify marginal area to interfere with any obstacle at the time of rotating action of the hydraulic excavator (that is an interference scope) on the overhead view image. The operator has clear visibility for visual recognition with respect to the forward field of view, the operator can judge by sight as to whether or not the front working mechanism would interfere with the obstacle. Therefore, it is toward the rearward direction, in most cases at the direction of the counterweight, for highly necessary to show the marginal area of interference at the time of swiveling action.

In this connection, the overhead view image is created by converting the view point from upper to downwardly by means of a camera image which is turned the optical axis toward obliquely downward direction. Therefore, the position coordinate becomes different position when the ground height (the height from the ground) is different. That is to say, in a case where there exists a height difference between the hydraulic excavator and the obstacle, difference is caused in relative positioning between them on the overhead view image. This is resulted by converting three-dimensional image taken from a camera to two-dimensional plane view at the time of creating the overhead view image processed by the coordinate conversion. The interfering scope shown becomes indefinite if not comply with the same ground height, such as height from the ground. In a case where the shown interfering scope with indefinite height standard, misunderstandings may arise for the operator.

Therefore, the object of the present invention is to represent precisely an interference scope shown on an overhead view image of surrounding situation of a slewing-type work machine.

Means for Solving the Problem

In order to solve the foregoing problem, in accordance with the present invention comprising; plural number of imaging devices, which are mounted on a slewing-type work machine, for taking images respectively toward downwardly inclined and at different directions; a view point converting section for performing coordinate conversion of image data taken from respective imaging devices to make overhead view images to look down from upper position; a composite overhead view image creating section to create a composite overhead view image arranged around symbolized view image of the slewing-type work machine; an interference scope indicating section to indicate on the overhead view image to cause interference with a surrounding obstacle placed according to the ground height at the time of rotating action of the slewing-type work machine; a display image producing section to display the composite overhead view image together with the interference scope on the display image; and a monitor to display the display image.

Now, the interference scope is settled on the basis of the positional relation between the rotating area of the slewing-type work machine and the position of an obstacle. More concretely, rear end of the rotating radius of the slewing-type work machine, in a case of a hydraulic excavator, rear end of a counterweight is determined as criterion of the interference scope. In connection with the hydraulic excavator, although a front working mechanism is provided on frontside thereof, the front working mechanism is not determined as criterion of the interference scope, even if it has rotating radius larger than that of the counterweight, because the operator can visually recognize the front working mechanism.

Although the interference scope marking section is settled on the basis of same ground height of the slewing-type work machine and the obstacle, same criterion of the interference scope can be applied even if there is difference in ground height between the slewing-type work machine and the obstacle, except that the slewing-type work machine is extremely inclined. However, it may be shown the obstacle into or out of the criterion depending upon the difference in height therebetween. Plural number of criterions of the interference scope can be indicated on the display device.

In a case where the obstacle is a dump truck, and when loading earth and sand on the dump truck, the rearmost portion of a vessel or the rear end portion of a frame of the dump truck can be determined the positional relationship of the criterion region at the time of swiveling action of the hydraulic excavator.

Further, in various kinds of dump trucks are used, wireless communication members can be provided for respective dump truck in order to identify the kind of the dump truck, thereby the interference scope marking section may indicate the interference scope of the rearmost portion of the vessel or the rear end portion of the frame at the ground height for respective dump trucks. In addition, the display image producing section can be so designed as to enter a numeral of the ground height of the interference scope.

In a case of indicating plural number of the interference scope on the display device, it can be set that the interference scope at the time of same ground height between the positioned height for the slewing-type work machine and located height of the interfered object is set as a standard interference scope, and the interference scope can be changed the interference scope in accordance with the difference in height, further the change of the interference scope may be performed manually or may be adjusted automatically depending upon the measured value of the difference in height. In a case that the obstacle is the dump truck as mentioned above, the height of the vessel is changed on the basis of the loaded earth and sand. Taking into consideration of this aspect, variation may be provided for the interference scope.

Effects of the Invention

According to the present, by indicating interference scope on the ground height of the composite overhead view image which allows comprehension the details for the surrounding situation of the slewing-type work machine, the extent of interference to the obstacle can be recognized precisely and easily.

BRIEF DESCRIPTION OF THE DRAWINGS

FIG. 7 shows a set of a hydraulic excavator, a large-sized dump truck and a small-sized dump truck.

EMBODIMENT OF THE INVENTION

Hereafter, embodiments of the present invention will be described with reference to the attached drawings. In the following description, a hydraulic excavator is referred to as an example for a slewing-type work machine, but the slewing-type work machine is not limited to the hydraulic excavator. For example, other work machines such as a crane truck and the like may be applicable as the slewing-type work machine. In short, any work machine to perform predetermined work with swiveling action may be included as the slewing-type work machine.

Figure 1:
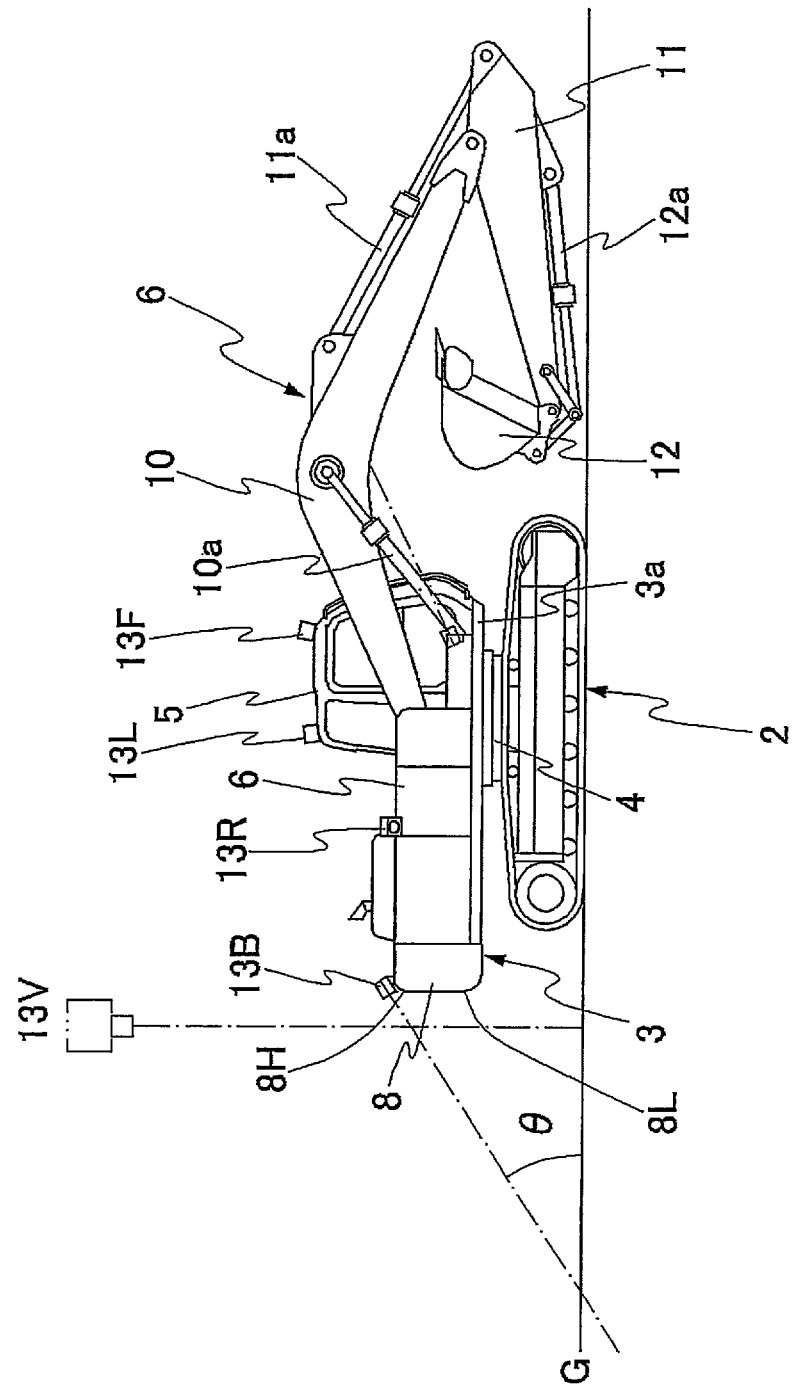
FIG. 1 is a side elevation view of a hydraulic excavator.

FIG. 1 shows a hydraulic excavator 1 as a slewing-type work machine. The hydraulic excavator 1 is consisting mainly of a lower traveling mechanism 2, upper swiveling mechanism 3 and a slewing apparatus 4. The lower traveling mechanism 2 is a traveling means of the hydraulic excavator 1, a crawler-type lower traveling mechanism 2 being exemplified in the present invention. The lower traveling mechanism 2 and the upper swiveling mechanism 3 are connected by the slewing apparatus 4, thus allowing to rotate upper swiveling mechanism 3 in respect to the lower traveling mechanism 2 by the operation of the slewing apparatus 4.

Thus accordingly, the hydraulic excavator 1 is functioned as a slewing-type work machine.

The upper swiveling mechanism 3 has an operator's cab 5, a front working member 6, a machinery house 7 and a counterweight 8. Various operating members for operating the hydraulic excavator 1 are provided in the operator's cab 5, an operator boarded in the operator's cab 5 operates the hydraulic excavator 1. Operating member for the slewing apparatus 4 is also provided in the operator's cab 5. The machinery house 7 is arranged at the rear position of the operator's cab 5 and the front working member 6, further rear position of the machinery house 7 being mounted the counterweight 8. In this connection, at the rear-most position of the counterweight 8, highest position from the ground G (height) is called as the uppermost portion 8H and the lowest position from the ground G is called as the lowermost portion 8L.

The front working member 6 is positioned side by side of the operator's cab 5 at the front side of the upper swiveling mechanism 3 which consists of a boom 10, an arm 11 and a bucket 12. The boom 10 is adapted to turn up and down by pivotally connected the proximal end with a connecting pin to a frame 3a of the upper swiveling mechanism 3. The arm 11 is connected to the distal end of the boom 10 for allowing to rotate up and down direction, further the bucket 12 being rotatably connected to the distal end of the arm 11. The operation to turn up and down is caused by a boom cylinder 10a. The arm 11 is driven by an arm cylinder 11a, the bucket 12 being driven by an bucket cylinder 12a. The bucket 12 is a replaceable front attachment, basically being connected for the sake of excavating earth and sand.

Cameras 13, as imaging members, are provided on the hydraulic excavator 1 respectively for taking images of different direction. In this embodiment, a rearward camera 13B to take image of rearward direction, a left side camera 13L for taking image of left side direction, a right side camera 13R for taking image of right side direction and forward camera 13F for taking image of forward direction, respectively of the hydraulic excavator 1. Respective cameras have the optical axis directed to the obliquely downwardly. In other words, respective cameras have the optical axis of the lens of inclined degree θ (0 degree<θ<90 degree) to the ground G. Merely the rearward camera 13B is shown in FIG. 1, but having same situation for other cameras 13L, 13R and 13F.

In FIG. 1, the rearward camera 13B is placed on the top of the counterweight 8, the left side camera 13L being placed on the top of the operator's cab 5, the right side camera 13R being on the top of the counterweight 8, and the forward camera 13F being located on the top of the operator's cab 5. However, these cameras may be located at optional positions. In addition, the visual fields of these cameras 13 are so designed as to be overlapped at the opposite ends each other by arranging each visual field, position and the like. For example, the visual field of the rearward camera 13B is brought to overlap with that of the left side camera 13L, and the rearward camera 13B being brought to overlap with that of the right side camera 13R. Thereby, blind area does not produced between the adjacent cameras 13.

Figure 2:
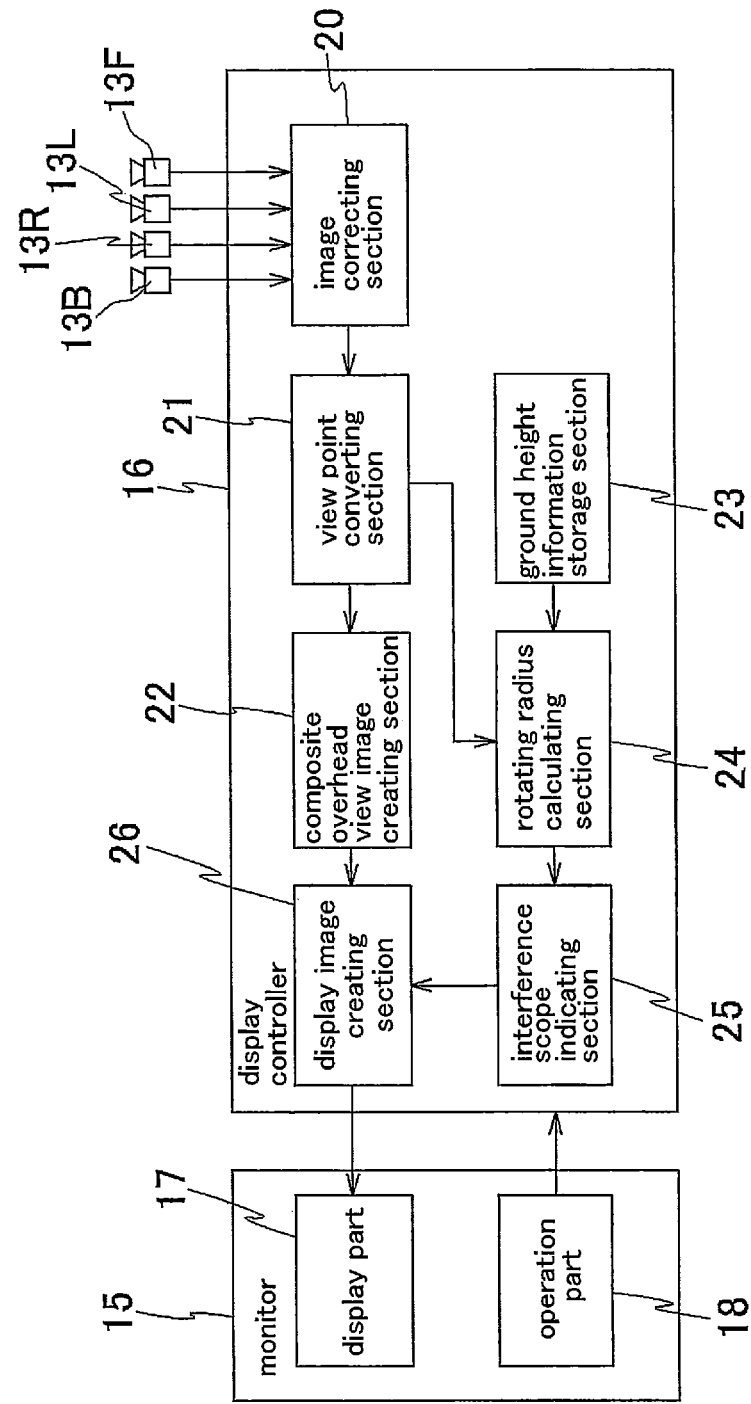
FIG. 2 is a block diagram of a display controller and a monitor.

FIG. 2 shows a monitor 15 and a display controller 16 for controlling the indication contents to the monitor 15. The monitor 15 consists of a display part 17 and an operation part 18. The display part 17 is a screen for showing an image of the output from the operation part 18. The operation part 18 is adapted to operate the display contents such as, for example, a button for the operation part 18. The operation part 18 is not in particular provided in a case of a touch panel structure.

The display controller 16 comprises an image correcting section 20, a view point converting section 21, a composite overhead view image creating section 22, a ground height information storage section 23, a rotating radius calculating section 24, an interference scope indicating section 25 and a display image creating section 26. The image creating section 20 is connected to the rearward camera 13B, the left side camera 13L, the right side camera 13R and the forward camera 13F, respective cameras 13 being adapted to take image. Various image correction processes such as distortion correcting, contrast correcting, color tone correcting are performed for the thus taken image (image data) on the basis of camera optical parameters and the like. Such corrections are processed to the four image data in the image correcting section independently due to image data being taken from respective cameras 13.

The view point converting section 21 performs process to convert the view point for image data which has been corrected the image data by the image correcting section 20. Respective cameras 13 take image directed the optical axis toward obliquely downwardly as shown in FIG. 1. According to the view point converting section 21, the view point conversion is performed so as to put the view point of the cameras 13 to upper position, resulting virtually plan view to see from upper to downward direction. The cameras 13 taken image of three dimensional space is subjected coordinate transformation to convert into a plane view from upper virtual view point 13V to downwardly (optical axis being vertical direction). This processing is view point conversion.

The view point conversion is performed for each image data of respective cameras 13. Therefore, four image data is performed processing of the view point conversion independently.

The image data of the rearward camera 13B which is performed the coordinate transformation is a rearward overhead view image, the image data of the left side camera 13L performed the coordinate transformation for taking a left side overhead view image, the image data of the right side camera 13R performed the coordinate transformation for taking a right side overhead view image and the image data of the forward camera 13F performed the coordinate transformation for taking a forward overhead view image. These four overhead view images are outputted to the composite overhead view image creating section 22.

The composite overhead view image creating section 22 composes to create a composite overhead view image from the four overhead view images. The composite overhead view image is composed of these four overhead view images around a plane view of a graphic image of a hydraulic excavator 1. Specifically, there are arranged the rearward overhead view image at the rearward position, the left side overhead view image at the left side, the right side overhead view image at the right side and the forward overhead view image at the forward, respectively of the graphic image. Therefore, the composite overhead view image is comprehensively created consisting of four overhead view images around the graphic image of the hydraulic excavator 1. The composite overhead view image which is created by the overhead view image creating section 22 outputs to the display image creating section 26.

The ground height information storage section 23 has a function to store as to a predetermined height (height from ground height G). The ground height has a meaning for determining height to indicate interference scope on the composite overhead view image. The ground height may not only be settled one type, but also plural number of different types of height levels can be settled. Also, the ground height can arbitrary be settled.

The rotating radius calculating section 24 has a function to the interference scope as a rotating radius for indicating on the composite overhead view image. The rotating radius calculating section 24 is inputted information for converting the view point, that is coordinate conversion information from the rotating radius calculating section 24. In a case where the upper swiveling mechanism 3 is actually swiveling at rotating radius R, the apparent rotating radius can be calculated at a specific position of the hydraulic excavator 1 in the ground height, at the time of converting the information of three dimension to two dimensional plane view image (overhead view image). As explained hereinbefore, since information as to the arbitral height from ground of the counterweight 8 is stored in the height level from ground height information storage section 23, the apparent rotating radius is calculated in accordance with information of height from ground.

The interference scope indicating section 25 is inputted the rotating radius R calculated by the rotating radius calculating section 24. As described, the display image creating section 26 is inputted the composite overhead view image data, thus indicating a circle of calculated rotating radius R on the image of the hydraulic excavator 1 at the place about the center of the composite overhead view image. This circle is an interference scope of the counterweight 8 at arbitral height.

The display image creating section 26 outputs an image of the composite overhead view image indicated the interference scope as a display image to the display part 17. The display part 17 shows the display image. Thereby, at the time of reviewing the operator to the display part 17 of the monitor 15, the detail of situation surrounding the hydraulic excavator 1 can be recognized by the composite overhead view image and be recognized the scope of interference to the counterweight 8 of the hydraulic excavator 1.

Figure 3:
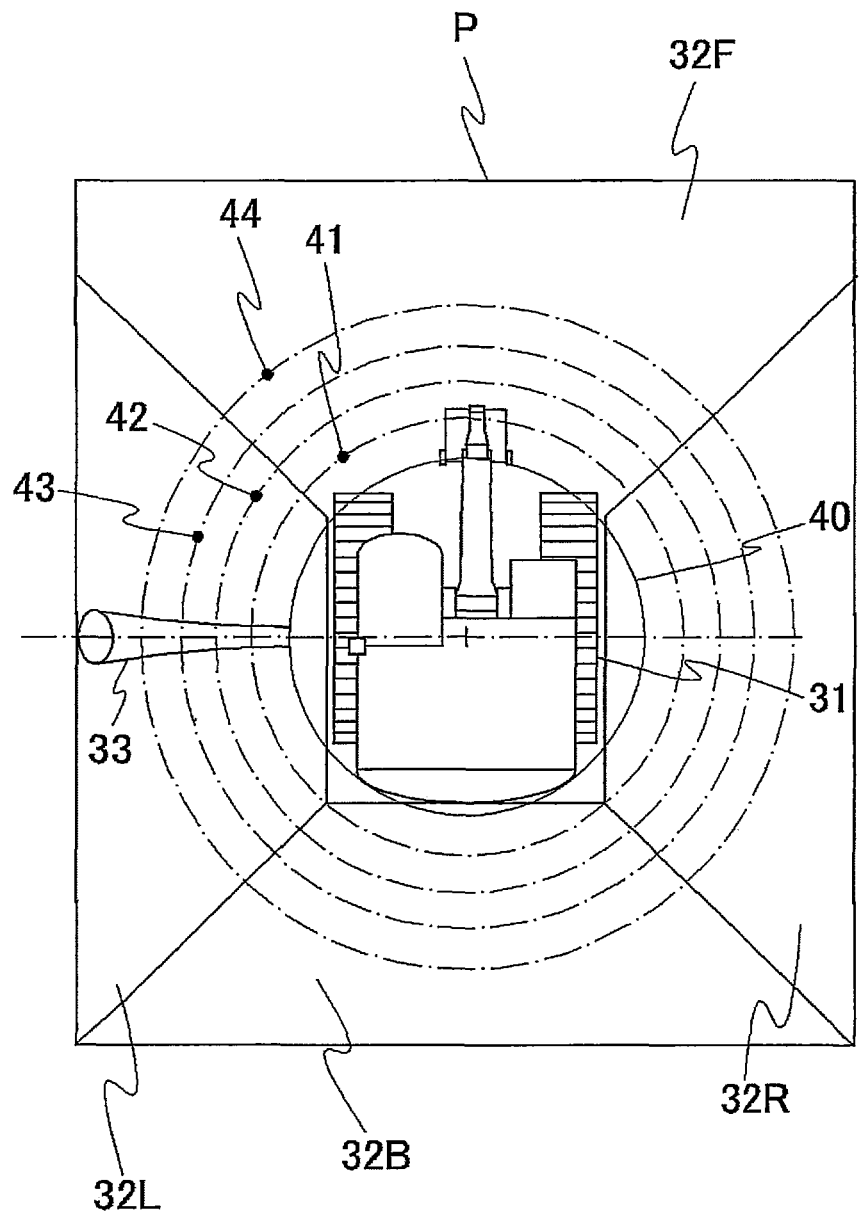
FIG. 3 is an example showing to indicating plural number of interference scopes on a composite overhead view image.

In the next place, the operation will be explained. FIG. 3 shows an example of a display image. This display image is produced in accordance with the following signal process. The four cameras 13 provided on the hydraulic excavator 1 take image at a predetermined cycle, but the forward camera 13F can be omitted due to securing an excellent visibility for forward view of the operator's cab 5.

As shown in FIG. 2, images taken from four cameras 13 (13B, 13R, 13L and 13F) are inputted to the image correction section 20. The image correction section 20 performs various image correction processes such as distortion correcting, contrast correcting, color tone correcting and the like for the four image data. The four image data after correction are outputted to the view point converting section 21.

The view point converting section 21 executes to convert the view point for the four view image data after correction. Since the respective cameras 13 take image of three dimensional space, these four image data are subjected to convert coordinate images into a view from upper virtual view point 13V to downwardly (optical axis being vertical direction). The processing as explained is to convert the view point.

The composite overhead view image P as shown in FIG. 3 is an image consisting of a rearward overhead view image 32B, a left side overhead view image 32L, a right side overhead view image 32R and a forward overhead view image 32F arranged around a symbolized view image 31 of the hydraulic excavator 1. Therefore, the composite overhead view image P is a composite image consisting of respective overhead view images. The operator boarded in the operator's cab 5 can be recognized the situation around the hydraulic excavator 1 by reviewing the composite overhead view image P, such as for example, when some obstacle is placed around there, the distance between the hydraulic excavator 1 and the obstacle intuitively and precisely. A pole 33 is erected near the hydraulic excavator 1 as shown on this figure.

As shown in this figure, interference scopes 40 through 44 are indicated around the view image 31. The interference scope 40 shown in a solid line is a circle of the rotating radius R of the counterweight 8 at the level zero of ground height (H0). While, shown with short dash lines are interference scopes 41 to 44 on appearance. The view direction of cameras 13 which are directed toward obliquely downwardly are converted the view point coordinate to vertical direction having the virtual view point 13V, the interference scopes 41 to 44 on appearance have height from ground height H1 to H4 (H1<H2<H3<H4) at the position of the pole 33 as the obstacle projected on the virtual plane. In short, at a time of swiveling action of the hydraulic excavator 1, the rotating radius on ground G, that is the ground height H0, is settled as R, the rotating radius becomes different depending upon the view angle of the visual line. The ground heights H1 to H4 which are determined as virtual planes, data about the ground heights H1 to H4 and the interference scopes 41 to 44 are stored in the ground height information storage section 23. In this instance, the ground height H4 is the highest position 8H of the rearmost position of the counterweight 8. The ground heights H2 and H3 are the heights divided equal parts between the ground height H1 and the ground height H4. The values of the ground heights can set manually beforehand or automatically.

The outermost moving track at the swiveling action of the hydraulic excavator 1 is the rearmost portion of the counterweight 8 except for the front working member 6. Since the front working member 6 is placed at the fore direction of the operator's cab 5, the operator can confirm certainly whether or not the front working member 6 is caused interference with some obstacle. However, it is difficult to judge by sight whether or not bringing the rearmost portion of the counterweight 8 into contact with some obstacle in the course of swiveling action of the hydraulic excavator 1.

Therefore, the operator can roughly judge whether or not the counterweight 8 will bring into contact with some obstacle, by paying notice of the display part 17 which shows the composite overview image P. However, as explained, the interference scope in the composite overhead view image P may change depending upon the ground height, even though at the same distance of the outermost position of the counterweight 8 from the center of the hydraulic excavator 1, because the composite overhead view image is a two dimensional plane image which is processed coordinate conversion from a three dimensional image.

Thus the rotating radius calculating section 24, which is inputted information as to the four ground heights H1 to H4 from the ground height information storage section 23, calculates apparent rotating radiuses R1 to R4 respectively at the ground heights H1 to H4 on the composite overhead view image thus processed view point conversion. In this instance, the rotating radius calculating section 24 is inputted the calculation method for convert the coordinate from the view point converting section 21, then calculating the apparent rotating radiuses R1 to R4 at four ground heights H1 to H4 based upon the inputted calculating method. When R1 is regarded as an apparent rotating radius at the ground heights H1, R2 being regarded as an apparent rotating radius at the ground heights H2, R3 being regarded as an apparent rotating radius at the height level H3 and R3 being regarded as an apparent rotating radius at the ground heights H4, the relation of "R1<R2<R3<R4" is satisfied due to the relation of "H1<H2<H3<H4" being established. Thus, the apparent rotating radius becomes smaller where it is lower the ground height, while the apparent rotating radius being larger where it is higher in the ground height, because that two dimensional overhead view image is prepared by converting coordinate transformation from three dimensional space at the view point converting section 21. In other words, when the overhead view image processed by an image obtained by inclined a certain degree for the optical axis of a camera, the height of a subject to take image is transformed to the distance from the center of swivel action, thus accordingly the height of the subject has a meaning to express the radius from the swivel center.

Therefore, the rotating radius calculating section 24 can confirm the apparent rotating radiuses R1 top R4 corresponding to the ground height from ground H1 to H4 at the rearmost position of the counterweight 8 of the hydraulic excavator 1. The thus calculated four apparent rotating radiuses R1 to R4 are outputted from the rotating radius calculating section 24 to the interference scope indicating section 25.

The display image creating section 26 is inputted data of the composite overhead view image from the overhead view image creating section 22, and the interference scope indicating section 25 indicates four interference scopes 42 to 44 (shown by dash lines) on the basis of four apparent rotating radiuses R1 to R4. That is, as shown in FIG. 1, a plotted circle having the rotating radius R1 is indicated as the interference scope 41, a plotted circle having the rotating radius R2 is indicated as the interference scope 42, a plotted circle having the rotating radius R3 is indicated as the interference scope 43, and a plotted circle having the rotating radius R4 is indicated as the interference scope 44.

Figure 4A:
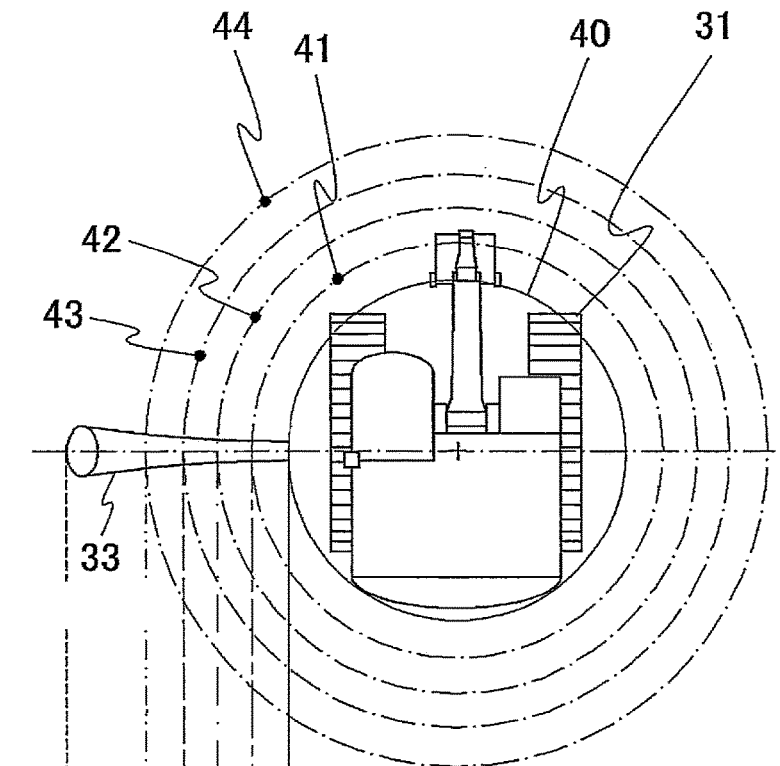
FIG. 4A and FIG. 4B are illustrative views showing relationship between a hydraulic excavator and the composite overhead view image.
Figure 4B:
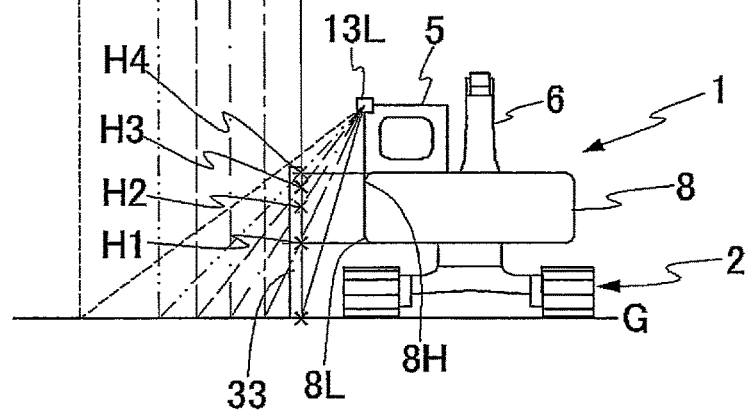

In the next place, the explanation is made for the relation between the interference scopes 41 to 44 and the actual height of the hydraulic excavator 1. FIG. 4A shows a part of the composite overhead view image P, while FIG. 4B is shown a picture view from the backward direction of actual hydraulic excavator 1. Further, there is shown the relation between the interference scopes 41 to 44 of FIG. 4A and the actual hydraulic excavator 1.

Although the pole 33 having a column shape as erected vertically in FIG. 4B, the pole 33 appears as distorted shape in FIG. 4A. This distortion results from the conversion in the view point converting section 21 of three dimensional image to the two dimensional overhead view image. As shown in FIG. 4B, because the pole 33 is erected vertical direction in reality, the ground heights H1 to H4 are at the same distance from the center of the hydraulic excavator 1. However, apparent rotating radiuses (R1 to R4) are shown different circles at the height level H1 to H4 due to the overhead view image P has been processed coordinate transformation.

As shown in FIG. 4A, the interference scopes 41 to 44 respectively indicate the ground heights H1 to H4, that means the rotating track of the rearmost end of the counterweight 8. Therefore, in a case where the obstacle is contacted with or placed within the interference scope 41 to 44, the obstacle becomes in contact with the counterweight 8. In a case shown in FIG. 4A, the counterweight 8 comes in contact with the pole 33 at every height positions H1 to H4 at the time of swiveling action. While, counterweight 8 does not contact with the obstacle positioned at the out of the interference scopes 41 to 44.

Therefore, by showing of display image consisting of the composite overhead view image and the interference scope at the arbitral ground height on the display part 17 of the monitor 15, the operator boarded in the operator's cab 5 can recognize the surrounding situation of the hydraulic excavator 1 in detail. In addition, the operator can confirm intuitively and certainly whether or not interference will occur against any obstacle by being clearly shown the interference scope at ground height, otherwise difficulty may be encountered to judge by the composite overhead view image coordinate transformation.

The interference scopes 41 to 44 are shown as circular shapes in the foregoing explanation, but may be shown as arcuate shapes. For example, in a case where the counterweight 8 is limited the extent for the rotating action, it is not necessary to indicate the interference scopes 41 to 44 at the range out of making rotating action, thus being shown in arcuate shapes. Although the actual interference scopes 41 to 44 are indicated as circular shapes, in a case of unable to indicate the complete interference scopes due to limitation of the display size in the display part 17, it may be partially not necessarily indicating them complete circles. Thus, the interference scopes 41 to 44 are indicated as arcuate shapes.

Although interference scopes 41 to 44 corresponding to the ground heights H1 to H4 are indicated in the composite overhead view image P, one single interference scope may be indicated therein. For example, the interference scope 44 may only be indicated for the ground height H4. The ground height H4 means the highest position 8H at the rearmost portion of the counterweight 8. There is not existed particular substance at higher position over the highest position 8H on the rearmost portion of the counterweight 8, thus no obstacle being brought contact with the above the highest position 8H at the rearmost portion of the counterweight 8.

Therefore, by indicating the interference scope 44 of the highest position 8H at the rearmost portion of the counterweight 8, operators can recognize that there is no possibility to contact the counterweight 8 with an obstacle. Further, since there is not any substance in the space under the lowest position 8L at the rearmost portion of the counterweight 8, even if an obstacle is existed at that place, the counterweight 8 does not contact with the obstacle, as far as the height of the obstacle being lower than position H1. Therefore, by indicating the interference scopes 41 and 44, one can recognize the possibility to contact with the obstacle within area of the interference scopes 41 to 44, while the other area being no possibility to contact with the obstacle at the time of swiveling operation. The interference scopes 42 and 43 can be shown at the equal intervals between the interference scopes 41 and 44, as FIGS. 3 and 4A.

In the next place, a modified example 1 is described hereinafter. According to the modified example 1, a dump truck 50 is illustrated as an example of the obstacle. As stated, the hydraulic excavator 1 is a work machine to excavate earth and sand, the dump truck 50 transports the excavated earth and sand. For this purpose, the dump truck 50 is placed stationary at a predetermined position to the hydraulic excavator 1. Then, the hydraulic excavator 1 is operated to make rotating action to load the earth and sand on a vessel 51 as the substance excavated by the hydraulic excavator 1. After the completion of loading the excavated substance by means of the bucket 12 on the vessel 51, the hydraulic excavator 1 is rotated again to carry out further excavation.

When the vessel 51 of the dump truck 50 is loaded a predetermined amount, the loading work of the excavated substance is suspended and the dump truck 50 travels to a predetermined correction area. At the same time, another dump truck 50 which is empty of the vessel 51 moves to the predetermined position relative to the hydraulic excavator 1, and starts the work to load the excavated substance. The foregoing operation is performed repeatedly. Therefore, plural number of dump trucks 50 (such as four or five number) are incorporated as a group for one hydraulic excavator 1. Normally, the dump trucks 50 in the same group are all same structure. That is, the specific works are performed with one hydraulic excavator 1 and plural number of dump truck 50 having same structure.

The foregoing referred dump truck 50 is a large-sized dump truck 50 (of course, may be small, middle or super large-sized dump truck). As shown in FIG. 5B, the large-sized dump truck 50 comes close to the hydraulic excavator 1 from backward direction. This movement is for the purpose of loading the excavated substance on the vessel 51. The vessel 51 is protruded rearward direction, and the rearmost position of the vessel 51 (vessel rearmost end 52) is the rearmost position of the large-sized dump truck 50. Therefore, the vessel rearmost end 52 comes into first contact with the hydraulic excavator 1. That is to say, the vessel rearmost portion becomes the obstacle.

The large-sized dump truck 50 moves backward direction to access by driving backwardly to the hydraulic excavator 1. The rearmost portion of the large-sized dump truck 50 is the vessel rearmost end 52. Therefore, the portion which firstly comes into contact with the counterweight 8 during is the vessel rearmost end 52. The interference scope during rotating action of the hydraulic excavator 1 should be determined on the basis of the vessel rearmost end 52. Thus accordingly, the ground height of the vessel rearmost end 52 is necessary to be recognized on the part of the hydraulic excavator 1.

In this connection, plural large-sized dump tracks 50 and one hydraulic excavator 1 are used as one set and the kind of large-sized dump truck 50 are to be in advance known by the hydraulic excavator 1. Therefore, information as to the height from ground height of vessel rearmost end 52 can be known beforehand. Information as to the height from ground height (called as H5) of the vessel rearmost end 52 of the large-sized dump truck 50 can be stored in the ground height information storage section 23 as described in FIG. 2.

The rotating radius calculating section 24 executes operation to the apparent rotating radius R5 on the basis of ground height H5. Further, interference scope indicating section 25 indicates the interference scope 45 having the apparent rotating radius R5 on the composite overhead view image P. Thereby, the composite overhead view image P containing the interference scope 45 is displayed on the display part 17 of the monitor 15. The interference scope 45 is a region corresponding to the ground height H5 of the large-sized dump truck 50, the operator of the hydraulic excavator 1 can recognize, when the counterweight 8 is performed rotating action under the circumstance that the vessel rearmost end 52 is placed into the interference scope 45 or in contact with the interference scope 45, the counterweight 8 is caused to contact with the vessel rearmost end 52 due to the vessel rearmost end 52 is placed within the swivel locus of the counterweight 8 as shown in dash line in FIG. 5.

In such a case, the operator of the hydraulic excavator 1 should stay not to swivel operation, and should command to the operator of the large-sized dump truck 50 to move away from the hydraulic excavator 1. Under this situation, the command is to move the hydraulic excavator 1 away to outside of the interference scope 45. Then, the counterweight 8 and the vessel rearmost portion 52 become not contact at the time of performing rotating action of the counterweight 8. After then, the operator of the hydraulic excavator 1 can operate to rotate the hydraulic excavator 1 for loading the excavated substance on the vessel 51.

Figure 5:
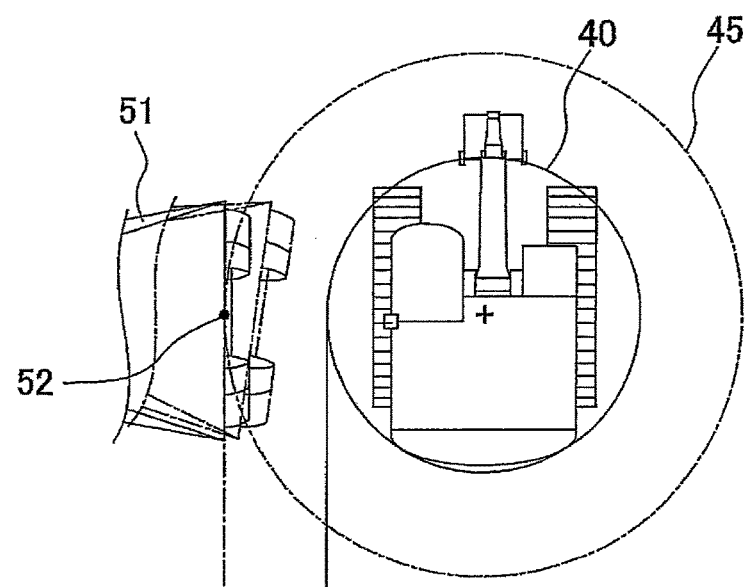
FIG. 5A and FIG. 5B show a large-sized dump truck and a composite overhead view image being indicated an interference scope therein corresponding to the large-sized dump truck.
Figure 5:
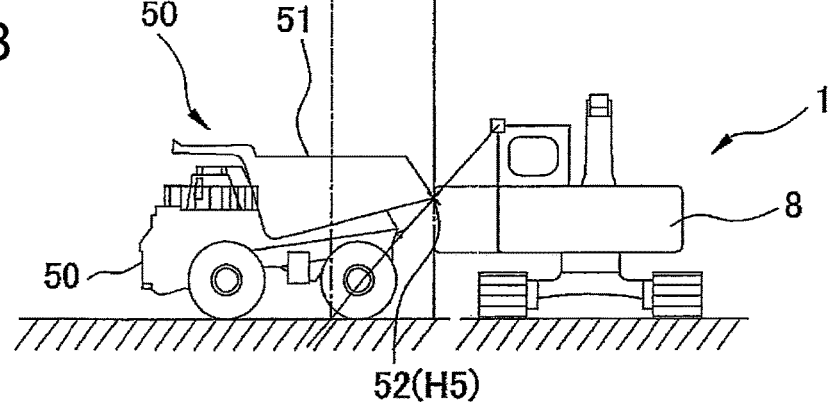
Figure 6A:
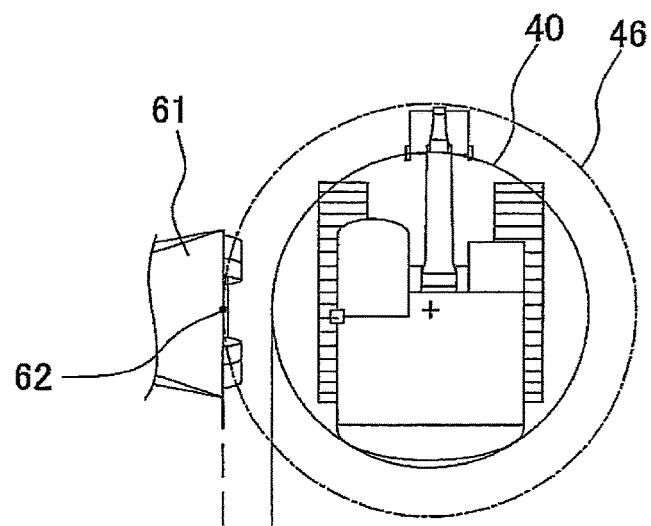
FIG. 6A and FIG. 6B show a small-sized dump truck and a composite overhead view image being indicated an interference scope therein corresponding to the small-sized dump truck.
Figure 6B:
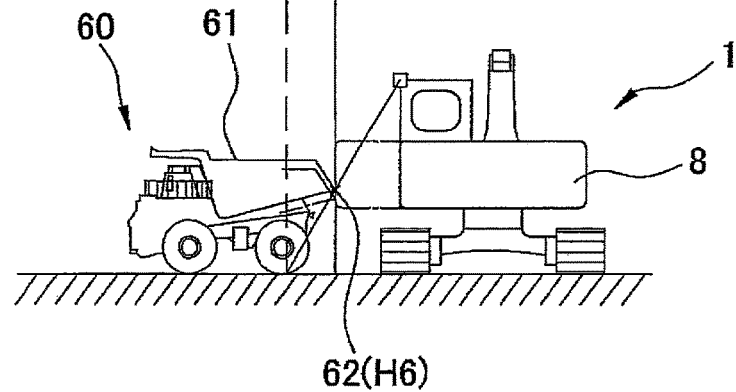

In the next place, explanation is made for using small-sized dump truck 60 with reference to FIG. 6. As a matter of fact, the small-sized dump truck 60 of FIG. 6 is smaller than the large-sized dump truck 50 of FIG. 5. Therefore, the ground height H6 of the rearmost portion of a vessel 61 (vessel rearmost end 62) is also lower than the ground height H5 of the vessel rearmost end 52 of the large-sized dump truck 50. As a result, the radius R6 of the interference scope 46 in the dump truck 60 is smaller than the radius R5 of the interference scope 45 in the dump truck 50. Therefore, the small-sized dump truck 60 can approach to the hydraulic excavator 1 to the proximal position to the interference scope 46.

As explained above, the height is different between the vessel rearmost end 52 of the large-sized dump truck 50 and the vessel rearmost end 62 of the small-sized dump truck 60. Namely, it is certain that H5>H6. Due to there is deference in radiuses R5 and R6, the interference scope 45 of the large-sized dump truck 50 is wider than the interference scope 46 of the small-sized dump truck 60. Since sizes of the interference scopes of 45 and 46 are different by the vessel rearmost ends 52 and 62, suitable interference scope is shown on the basis of the kind of the dump truck. The kind of the dump truck is known beforehand, thereby optimum interference scope can be indicated by being stored the known information in advance in the ground height information storage section 23.

In this connection, generally one hydraulic excavator 1 is consisting a group with the same kind dump truck in the foregoing embodiment. However, there may be a group consisting of one hydraulic excavator 1 and different types dump trucks. For example, in some cases, as shown in FIG. 7, there is a case that one hydraulic excavator 1 is allotted the large-sized dump truck 50 and small-sized dump truck 60.

Figure 8A:
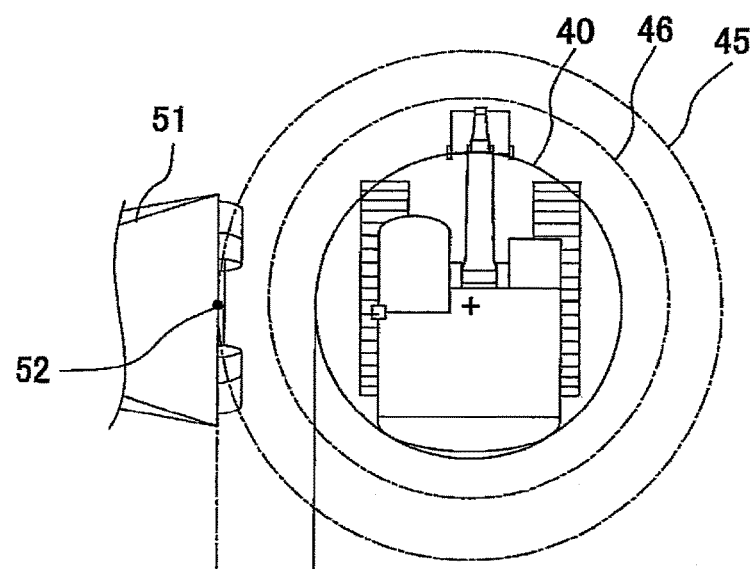
FIG. 8A and FIG. 8B show actual large-sized dump truck, and a composite overhead view image being indicated two interference scopes of the large-sized dump truck and the small-sized dump truck.
Figure 8B:
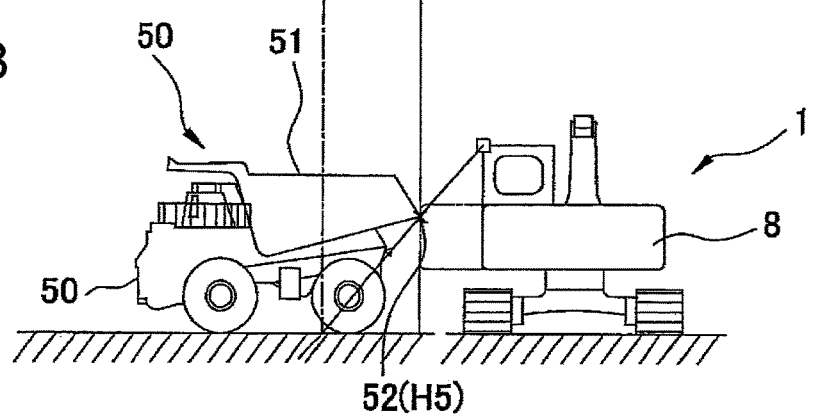
Figure 9A:
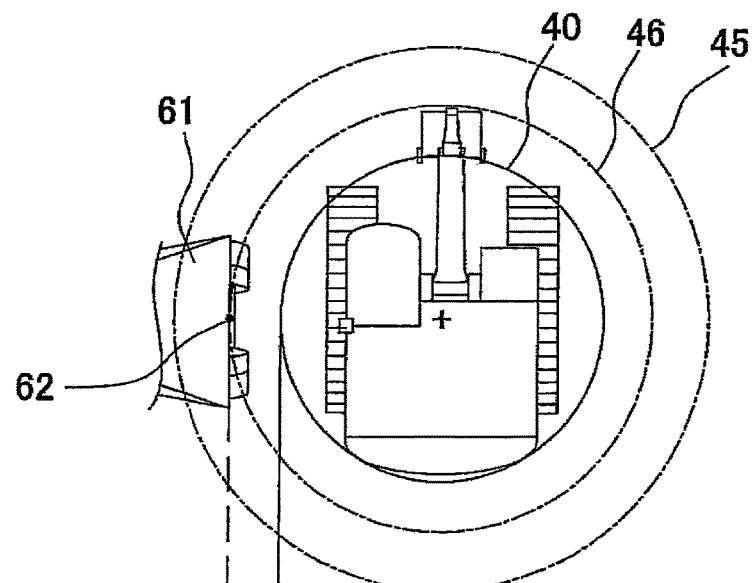
FIG. 9A and FIG. 9B show actual small-sized dump truck, and a composite overhead view image being indicated two interference scopes of the small-sized dump truck and the large-sized dump truck.
Figure 9B:
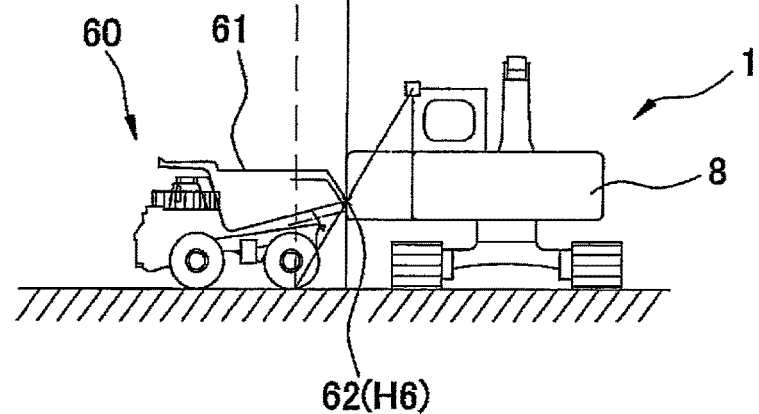

In the case to use two types of large-sized dump truck 50 and small-sized dump truck 60, the interference scope 45 of the large-sized dump truck 50 differed to the interference scope 46 of the small-sized dump truck 60. Therefore, as shown in FIGS. 8 and 9, two types of the interference scope 45 and the interference scope 56 are adapted to indicate on the composite overhead view image. FIG. 8 shows the loading work of the hydraulic excavator 1 to the vessel 51 of the large-sized dump truck 50. While, FIG. 9 shows the loading work of the hydraulic excavator 1 to the vessel 61 of the small-sized dump truck 60.

As shown in FIGS. 8 and 9, the two types of the interference scopes 45 and 46 can be indicated on the composite overhead view image P. The operator who boarded in the operator's cab can recognize by sight which type of the large-sized dump truck 50 or small-sized dump truck 60 can perform the work to load the excavated substance. The operator can recognize, at the time of loading the excavated substance, whether or not the counterweight 8 is liable to contact with the vessel rearmost end 52 when performing rotating action with reference to the interference scope 45. Namely, as shown in FIG. 8, in a case where the vessel rearmost end 52 is placed in contact with the interference scope 45 on the composite overhead view image P or placed within the interference scope 45, the counterweight 8 is assumed to bring into contact with the vessel rearmost end 52 at the time of rotating action.

While, in a case of loading the excavated substance on the small-sized dump truck 60, in a case of loading the excavated substance to the small-sized dump truck 60, the operator can judge by sight of the interference scope 44 as to whether or not the counterweight 8 and the vessel rearmost portion 62 contact with each other at the time of rotating action. That is, as shown in FIG. 9, when the vessel rearmost portion 62 is placed in contact with the interference scope 46 on the composite overhead view image P or placed within the interference scope 46, the counterweight 8 is assumed to bring into contact with the vessel rearmost portion 62 at the time of swiveling action. As shown in FIG. 9, the vessel rearmost end 62 of the small-sized dump truck 60 is positioned within the interference scope 45 which is defined as the vessel rearmost end 52 of the large-sized dump truck 50. However, the interference is not occurred as far as the vessel rearmost end 62 of the small-sized dump truck 60 is positioned out of the interference scope 46, even though within the interference scope 45.

In the next place, a modified embodiment 2 is explained. As explained, in a case of the large-sized dump truck 50 and the small-sized dump truck 60 are mixed for grouping with one hydraulic excavator 1, the interference scope indicating section 25 indicates two interference scopes 45 and 46 on the composite overhead view image, and the operator of the hydraulic excavator 1 judging by sight to perform loading work of the excavated substance used by the large-sized dump truck 50 or the small-sized dump truck 60.

Figure 10:
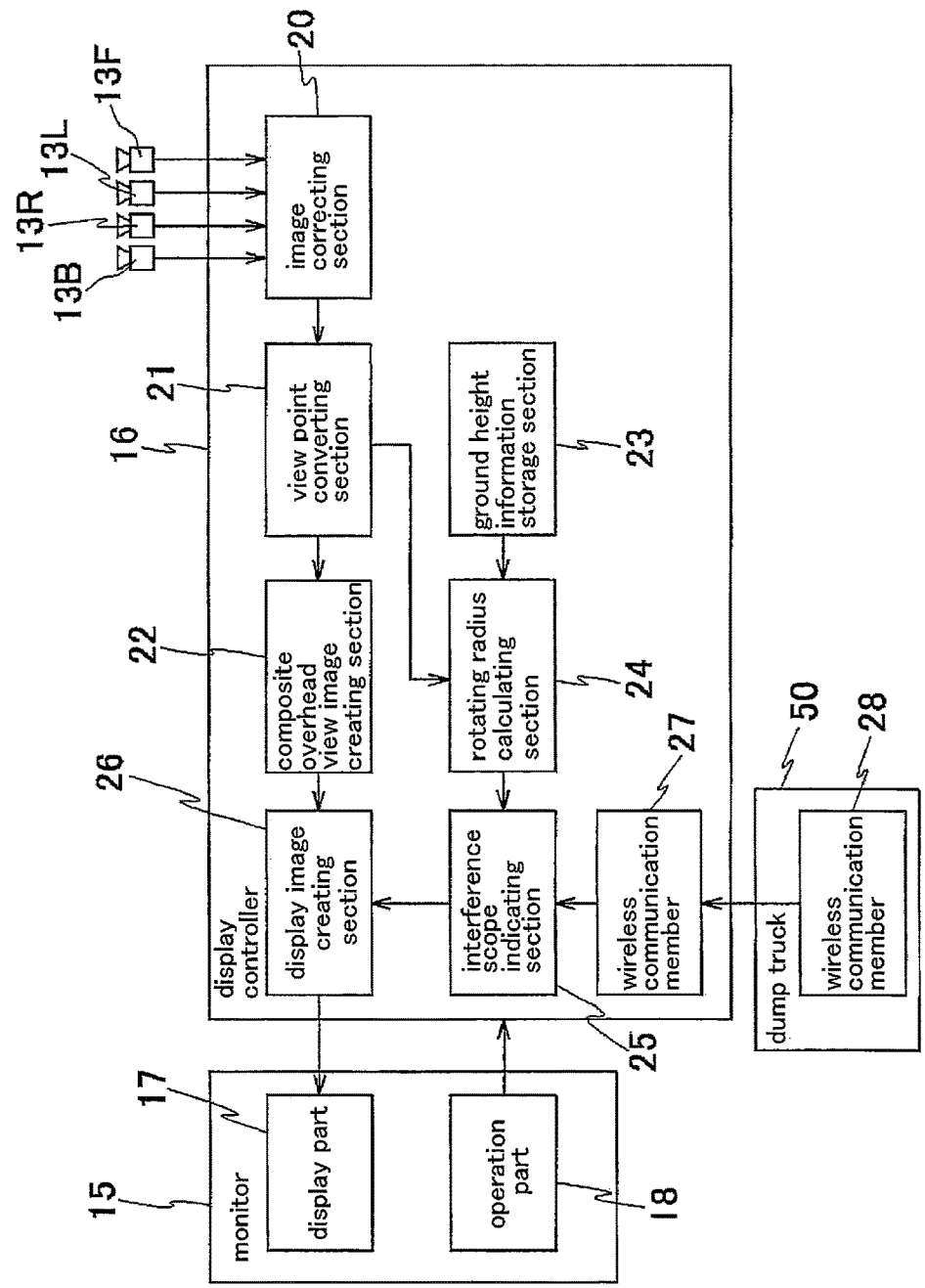
FIG. 10 is a second embodiment of a block diagram of a display controller and a monitor.

According to the modified embodiment 2, the interference scope to be indicated is automatically selects from the different kind of the dump truck without necessitated the sight of the operator. FIG. 10 shows a block diagram for the modified embodiment 2. A wireless communication device 27 is provided further in addition to FIG. 2. In addition, a wireless communication device 28 is also provided for the dump truck (large-sized dump truck 50 and small-sized dump truck 60). Communication can be performed between the wireless communication devices 27 and 28.

The wireless communication device 28 of the dump truck performs communication with the wireless communication device 27 to inform the kind of the own dump truck. Thereby, the wireless communication device 27 can identify the kind of the dump truck. In this embodiment, the identification is performed as to the large-sized dump truck 50 or the small-sized dump truck 60. The information as to the kind of the dump truck is outputted to the interference scope indicating section 25. The interference scope indicating section 25 indicates on the composite overhead view image P the interference scope 45 in a case of operating the large-sized dump truck 50 or otherwise the interference scope 46 in a case of operating the small-sized dump truck 60.

As described, the kind of dump truck can be recognized by the hydraulic excavator 1, by means of the wireless communication between the hydraulic excavator 1 and the dump truck, thereby being able to indicate the interference scope 45 or 46 depending upon the thus recognition. Some communication is also able to send from the hydraulic excavator 1 to the dump truck. Therefore, the display image created by the display image creating section 26 may be send to the dump truck by manner of wireless communication.

By providing a monitor in the dump truck, the monitor can shows the display image on the display part received by means of wireless communication, thereby the positional relation between the vessel rear end and the interference scope being recognized on the part of the dump truck. Therefore, the operator of the dump truck is adapted to move away the dump truck from the hydraulic excavator in a case of the vessel rearmost end being contact or entered into the interference scope. Thereby, the vessel rearmost end is removed away from the interference scope for allowing not to interfere the counterweight 8 of the hydraulic excavator 1 at the time of rotating action.

Figure 11A:
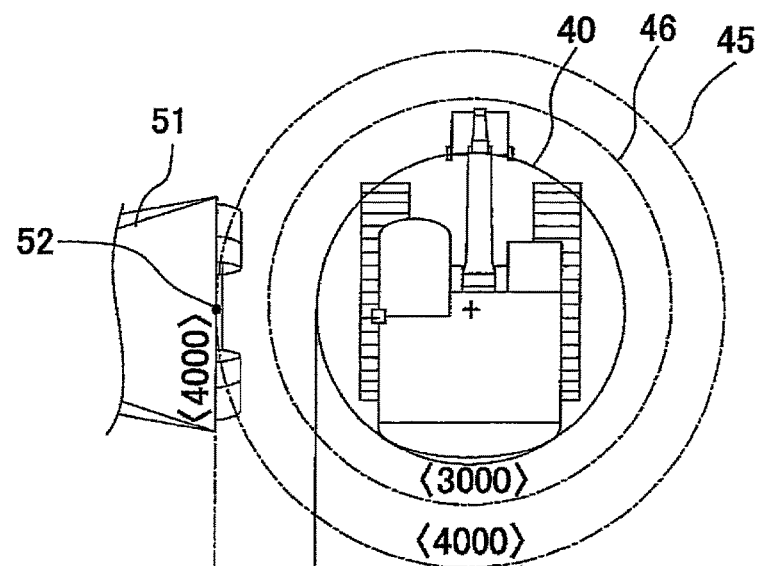
FIG. 11A and FIG. 11B show an embodiment illustrating information as to ground height added on FIG. 5.
Figure 11B:
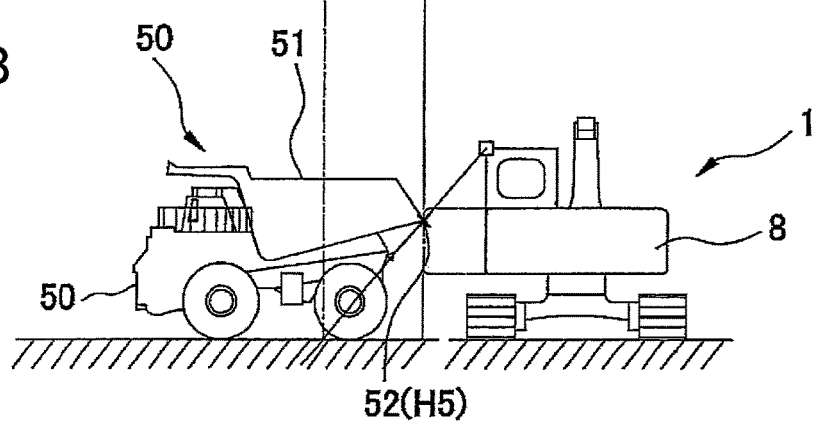

Further, a modified embodiment 3 is explained hereafter. Information as to the ground height of the interference scope is additionally shown in the modified embodiment 3, when the display image creating section 26 indicates the interference scope on the composite overhead view image P. FIG. 11 shows the interference scope 45 for the vessel rearmost end 52 of the large-sized dump truck 50 and the interference scope 46 for the vessel rearmost end 62 of the small-sized dump truck 60 on the composite overhead view image P. The interference scope 45 is indicated on the basis of the ground height H5 of the vessel rearmost end 52 of the large-sized dump truck 50 which is stored in the ground height information storage section 23, and the interference scope 46 is indicated on the basis of the ground height H6 of the vessel rearmost end 62 of the small-sized dump truck 60 which is also stored in the ground height information storage section 23.

Information as to the ground height for the interference scopes 45 and 46 can be added to indicate on the basis of the information concerning the ground heights H5 and H6 which are stored in the ground height information storage section 23. In the case of FIG. 11, the ground height H5 is 4000 cm and the ground height H6 is 3000 cm. Thereby, the operator of the hydraulic excavator can recognize more clearly the ground height of the interference scopes 45 and 46 respectively.

In this connection, the large-sized dump truck 50 is partially shown on the composite overhead view image P as shown in FIG. 11. The vessel 51 is not loaded any excavated substance before starting and the outer surface of the vessel 51 is exposed. In such a case, it may be indicated on the surface of the vessel 51 information as to the ground height of the vessel rearmost end 52 (4000 cm in FIG. 11). Thereby, at the time that the operator pays the attention to the displayed image that is the display image of the composite overhead view image P with the interference scopes 45 and 46 shown on the display part 17 of the monitor 15, the operator can recognize information as to the ground height of the vessel rearmost end 52 shown on the surface of the vessel 51. Because of the interference scope 45 being shown on the composite overhead view image P, those have same ground height on the basis of information indicated on the surface of the vessel 51 (4000 cm) and information of the interference scope (4000 cm). Therefore, it can be recognized the interference scope 45 is liable to contact to the counterweight 8, even though being indicated two interference scopes 45 and 46 on the composite overhead view image.

Figure 12A:
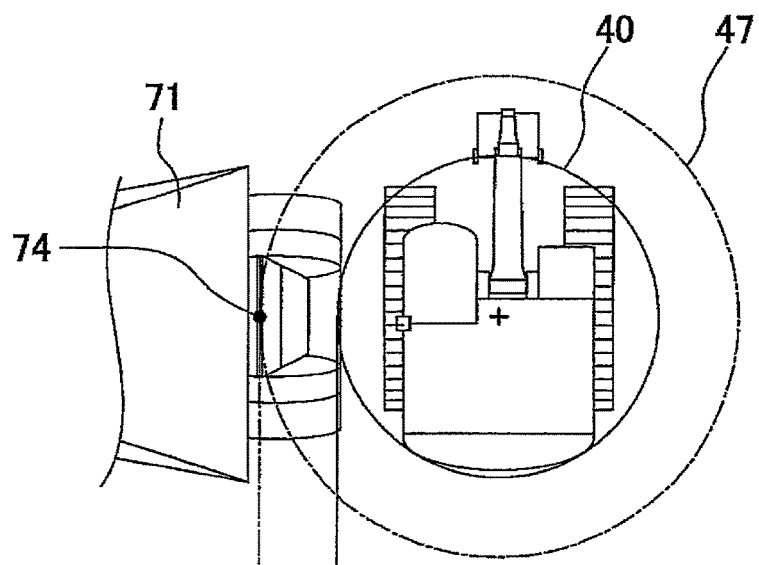
FIG. 12A and FIG. 12B show a super large-sized dump truck, and a composite overhead view image being indicated an interference scope therein corresponding to the super large-sized dump truck.
Figure 12B:
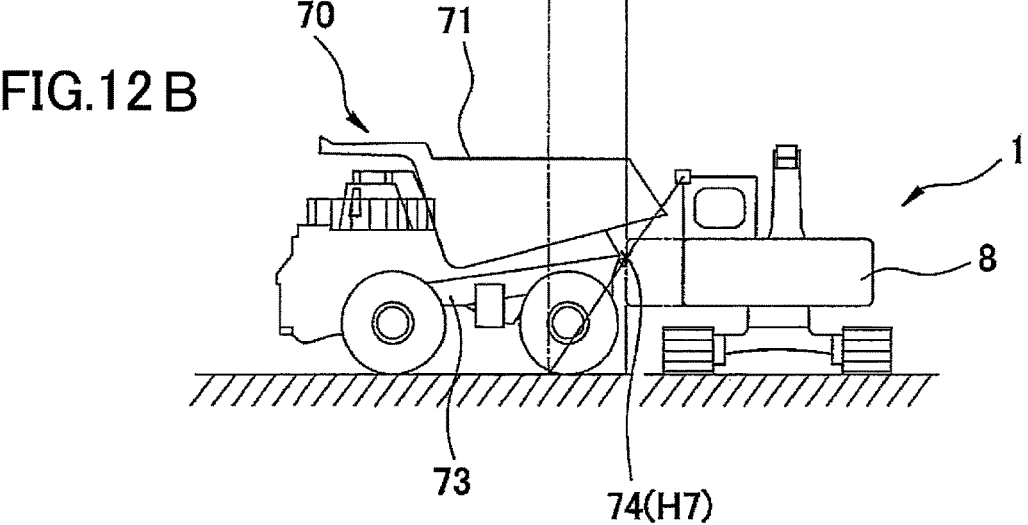

In the next place, a modified embodiment 4 is explained. The dump truck to be loaded the excavated substance from the hydraulic excavator 1 is an super large-sized dump truck 70 as shown in FIG. 12. The super large-sized dump truck 70 is provided a vessel 71 for loading the excavated substance from the hydraulic excavator 1. The vessel rearmost end 72 of the super large-sized hydraulic excavator 70 stands higher than the uppermost portion 8H (ground height H4) of the counterweight 8 of the hydraulic excavator 1, thus accordingly the counterweight 8 being not contact with the vessel rearmost end 72 at the time of operating the slewing apparatus 4.

The super large-sized dump truck 70 has a frame 73 as a basic framework, a vessel 71 is mounted on the frame 73. Therefore, there is a possibility that ground height H7 of the frame rearmost end 74 of the frame 74 is brought into contact with the counterweight 8. In other words, the ground height H7 of the frame rearmost end 74 has a height between the ground height H4 of the uppermost portion H4 and lowermost portion H1 of the counterweight 8. In such a case, the frame rearmost end 74 is the criterion in place of the vessel rearmost end 72.

Therefore, in the case of the super large-sized dump truck 70 is combined with the hydraulic excavator 1 as a group, the ground height information storage section 23 stores the ground height H7 of the frame rearmost end 74 in the super large-sized dump truck 70, thereby allowing to calculate the rotating radius R7 in accordance with the ground height H7 by the rotating radius calculating section 24. Further, the interference scope indicating section 25 performing to indicate the interference scope 47 on the basis of the rotating radius R7. Thereby, it can be able to judge whether or not the counterweight 8 may be brought into contact with the frame rearmost end 74 at the time of rotating action of the counterweight 8.

Further, the frame rearmost end 74 is painted with different color than the other portion of the frame. The positional relation can be recognized clearly between the frame rearmost end 74 and the interference scope 47 at the time of reviewing the displayed image. Thereby, it can easily be judged whether or not the interference is occurred between the frame rearmost end 74 and the interference scope 47, by clearly being the position of the colored frame rearmost end 74.

Figure 13A:
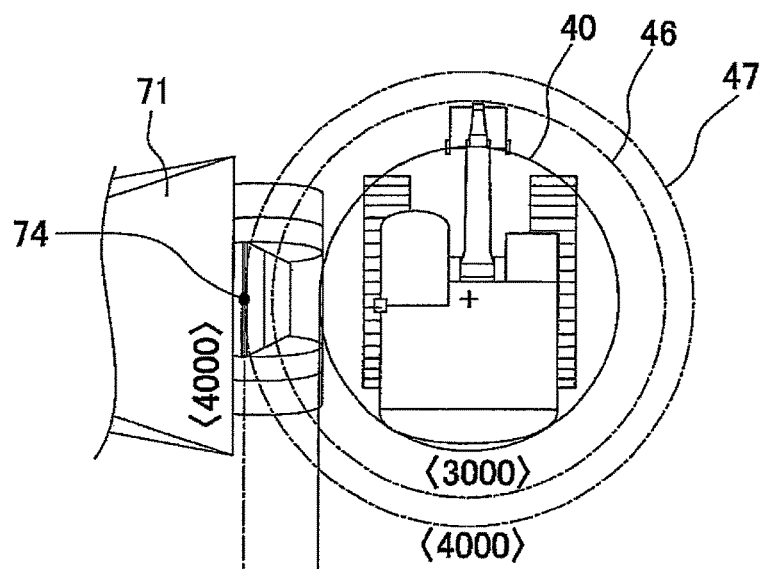
FIG. 13A and FIG. 13B show an embodiment illustrating information as to ground height added on FIG. 11.
Figure 13B:
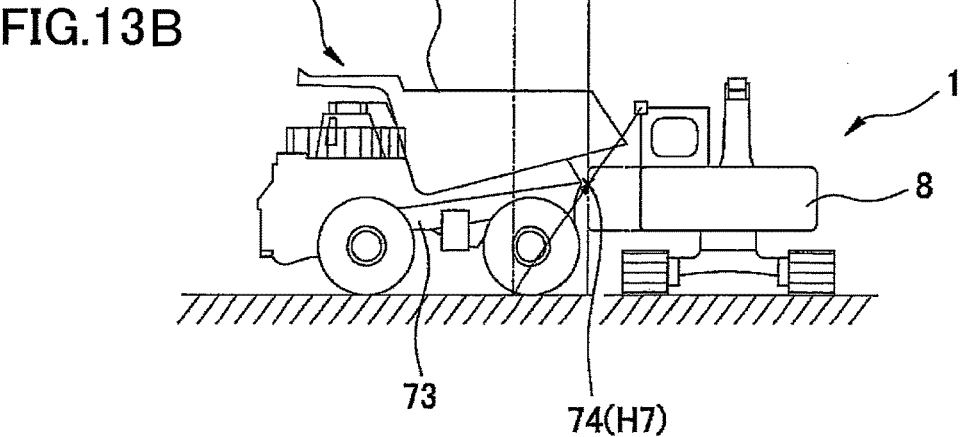

FIG. 13 shows an embodiment to indicate plural interference scopes on the composite overhead view image. In a case of the small-sized dump truck 60, as shown in FIG. 6, the vessel rearmost end 62 is possible to contact with the counterweight 8 at the rotating action. Therefore, the interference scope indicating section 25 indicates the interference scope 46 as shown in FIG. 6. While, in the case of the super large-sized dump truck 70, the frame rearmost end 74 is possible to interfere with the counterweight 8 at the time of rotating action. Therefore, the interference scope indicating section 25 indicates the interference scope 47 as in FIG. 11.

As shown in FIG. 13, in contrast with the interference scope 46 is indicated for the ground height H6 corresponding to the vessel rearmost end 62 in small-sized dump truck 60, the interference scope 47 is to be indicated for ground height H7 corresponding to the frame rearmost end 74, thus allowing to automatically indicate the interference scope which is likely to cause contact with the counterweight 8 at the time of swiveling action.

Hereafter, a modified embodiment 5 is explained. The forgoing modified embodiments are indicated the interference scopes of the areas which are possibly caused interferences between the counterweight 8 and the vessel rearmost end or frame rearmost end at the swiveling action of the counterweight 8. In this embodiment, there is indicated the area of best position to be loaded the excavated substance of the hydraulic excavator 1 to a dump truck (in this case, a large-sized dump truck).

Figure 14:
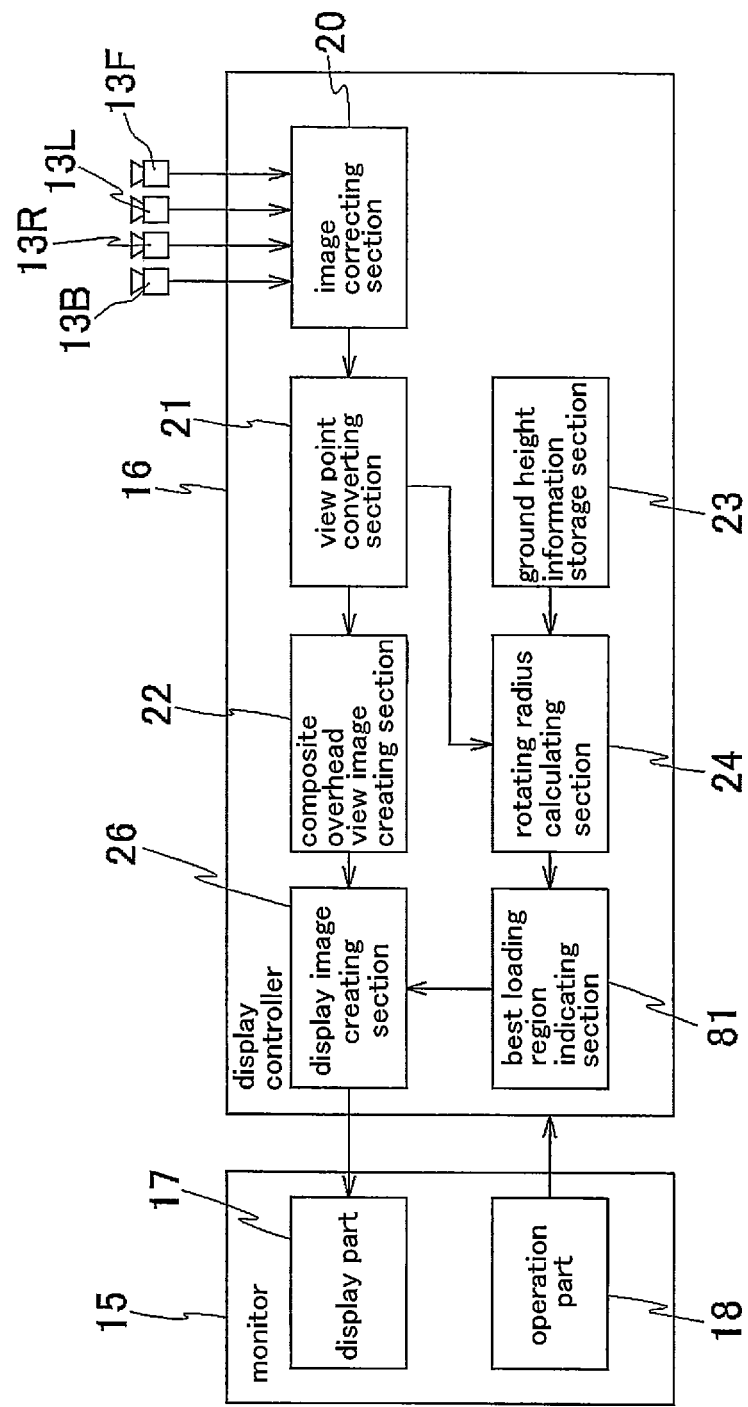
FIG. 14 is a fifth embodiment of a block diagram of a display controller and a monitor.

FIG. 14 is added a best loading region indicating section 81 replaced of the interference scope indicating section 25 of the display controller 16 shown in FIG. 2. The best loading region means an optimum position to stay the hydraulic excavator 1 for performing the loading work of excavated substance from the hydraulic excavator 1 to the large-sized dump truck 50. When the vessel rearmost end 52 of the large-sized dump truck 50 is positioned out of the interference scope 45, interference is not occurred between the vessel rearmost end 52 and the counterweight 8. Therefore, the large-sized dump truck 50 is adapted to shift the position up to substantially contact with the interference scope 45.

However, even though the vessel rearmost end 52 is placed out of the interference scope 45, in a case when the large-sized dump truck 53 is brought excessively close to the hydraulic excavator, difficulty may be encountered for loading work of the excavated substance from the hydraulic excavator 1 to the vessel 51 of the large-sized dump truck 50. The best loading region is the region that the vessel rearmost end 52 is placed at optimum position in accordance with the ground height on performing the loading work from the hydraulic excavator 1 to the large-sized dump truck 50. The best loading region indicating section 81 indicates the optimum position of the best loading region. The best loading region is expressed with a circle on the composite overhead view image P, the radius is longer than the interference region.

While, although, in the foregoing embodiments, the hydraulic excavator 1 as the slewing-type work machine stands at the same height (ground G) with the dump truck 50 (or dump truck 60, 70) as the obstacle, there are some cases that the hydraulic excavator 1 is positioned at a ground of different height on the ground positioned the dump truck 50. However, even differential in the high level, the interference scope between the hydraulic excavator 1 and dump truck 50 does not vary as far as not changed the position of a horizontal direction, but the interference scope 45 being not necessarily exact the apparent rotating radius R5 which is indicated on the composite overhead view image P.

Figure 15A:
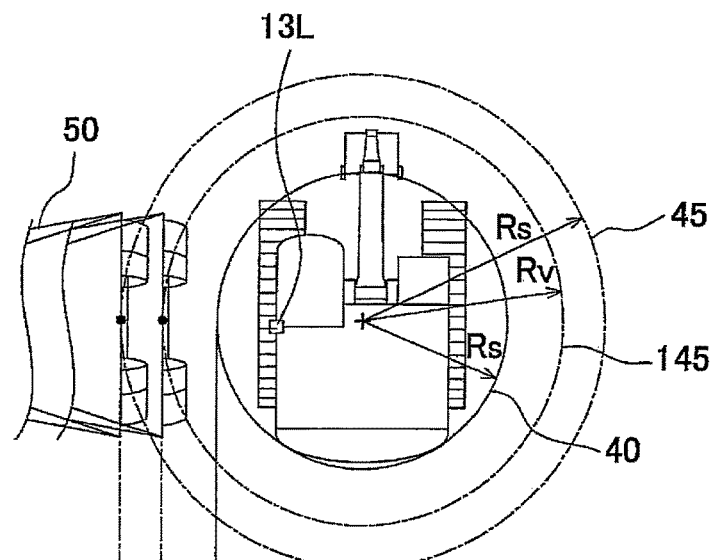
FIG. 15A and FIG. 15B show a composite overhead view accompanied with an interference scope in a case that hydraulic excavator and a dump truck are positioned at a differential height.
Figure 15B:
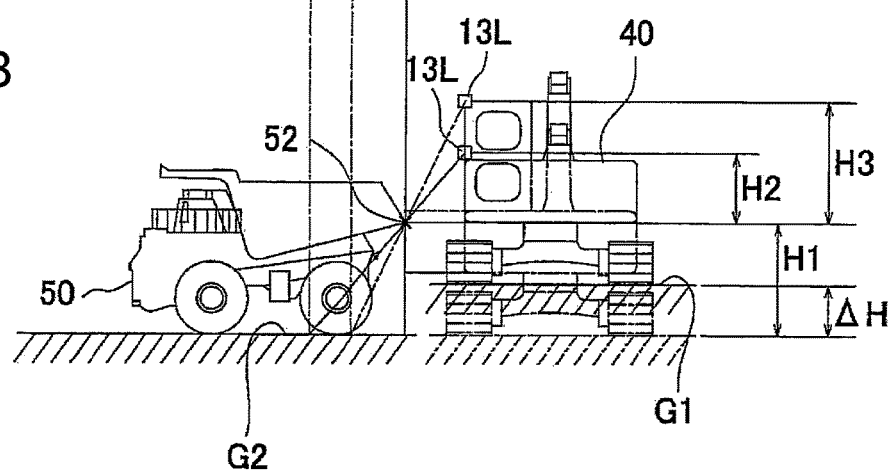

That is, as shown in FIG. 15, if the hydraulic excavator 1 stands on the ground G1 and the dump truck 50 stands on the ground G2, the positional relation is same in the horizontal direction between the hydraulic excavator 1 and the dump truck 50 as shown in FIG. 5, even though the ground G1 being higher than or lower than the ground G2 at a degree of height ΔH.

However, as shown in FIG. 15, the position on the image of the vessel rearmost end 52 attained by the left side camera 13L is indicated the position shifted at the distance ΔL from the position shown in FIG. 5 toward the hydraulic excavator 1, as a result the interference scope 45 on the composite overhead view image being indicated as if the hydraulic excavator 1 is brought into contact with the dump truck 50 at the time of rotating action. Such situation is caused by performing the view point transforming process depending on the change in angle of the optical axial center to the surface of object and in the ground height of the dump truck 50 from the height position of the camera 13L.

For this reason, in a case of the hydraulic excavator 1 has a difference in height to the dump truck 50 in the displayed composite overhead view image P, the interference scope 45 at the time of the hydraulic excavator 1 and the dump truck 50 which are positioned the same horizontal plane is modified to an interference scope 145 in accordance with the difference of height ΔH. The modification carry out based on the measurement or calculation.

Further, there may be difference in the height of the vessel rearmost end of the dump truck 50 positioned the hydraulic excavator 1 and the dump truck 50 on the same horizontal plane. The height of the vessel rearmost end 52 is changed between before and after loading earth and sand on the vessel 51, due to the compression degree of the tires and the suspension weight of the suspension mechanism. For the reason, the position of the vessel rearmost end at the time of full loading state is closed positioned on the composite overhead view image within the interference scope 45 (or 145) which is set at the time of empty state.

Figure 16A:
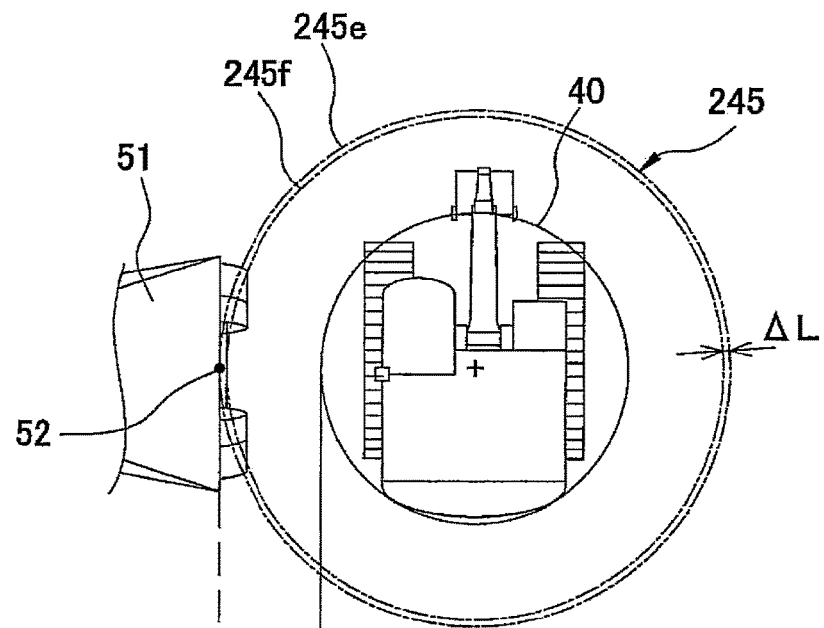
FIG. 16A and FIG. 16B show an illustrative view in changing the interference scope between empty state and loaded state of the dump truck.
Figure 16B:
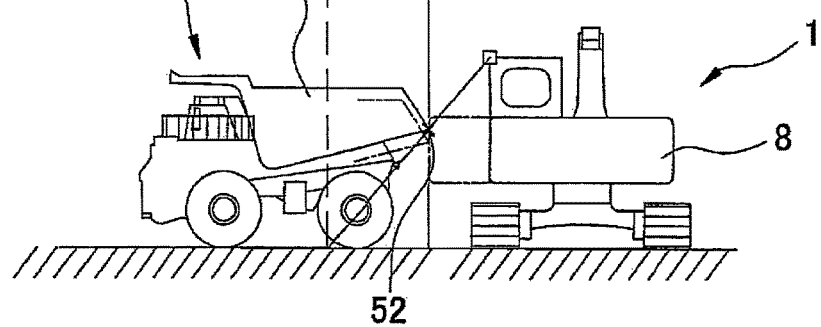

To avoid confusion for the operator to operate the hydraulic excavator 1, as shown in FIG. 16, the interference scope 245 may be set to have a width, the outer end being interference scope of empty state and the inner end being interference scope of full loaded state.

DESCRIPTION OF REFERENCE NUMERALS

1: hydraulic excavator
4: slewing apparatus
5: operator's cab
8: counterweight
13: camera
15: monitor
16: display controller
17: display part
20: image correcting section
21: viewpoint converting section
22: overhead view image creating section
23: ground height information storage section
24: rotating radius calculating section
25: interference scope indicating section
26: display image creating section
27, 28: wireless communication member
31: symbolized view image
40-47, 145, 245: interference scope
50: large-sized dump truck
52: vessel rearmost end
60: small-sized dump truck
62: vessel rearmost end
70: super large-sized dump truck
73: vessel rearmost end
73: frame
74: frame rearmost end
H1-H7: ground height
P: composite overhead view image
R1-R7: rotating radius

The invention claimed is:

1. A surrounding monitoring device for a slewing-type work machine comprising:
   a lower travelling structure;
   an upper swiveling structure connected to the lower travelling structure;
   a counterweight which forms a rear end part of the upper swiveling structure;
   a plural number of imaging devices, which are mounted on the upper swiveling structure, for taking images respectively downwardly inclined and at different directions;
   a controller connected to the imaging devices and programmed to:
   receive image data from the imaging devices and perform view point coordinate conversion of the image data taken from the respective imaging devices to generate overhead view images showing a view looking down from an upper position,
   create a composite overhead view image from the overhead view images, the composite overhead view image being arranged around a symbolized view image of the slewing-type work machine,
   indicate on the composite overhead view image an interference scope of the counterweight of the upper swiveling structure that would cause interference with a surrounding obstacle according to a height above ground level of the counterweight at a time of rotating of the slewing-type work machine, and
   generate the composite overhead view image together with the interference scope as a display image; and
   a monitor that displays the display image,
   wherein the controller is further programmed to:
   indicate on the composite overhead view image the interference scopes as rotating radiuses of the counterweight at multiple heights above ground level including at a highest position and a lowest position above ground of a rearmost end of the counterweight.

2. The surrounding monitoring device for the slewing-type work machine according to claim 1, wherein the controller is further programmed to indicate the rotating radiuses on the composite overhead view image at equal intervals between the interference scopes of the highest and lowest positions.

3. The surrounding monitoring device for the slewing-type work machine according to claim 1, wherein the slewing-type work machine is a hydraulic excavator, and the controller is further programmed to indicate as one of the rotating radiuses of the interference scopes on the composite overhead view image a ground height of a portion of a dump truck closest to the hydraulic excavator which transports excavated substance from the hydraulic excavator.

4. The surrounding monitoring device for the slewing-type work machine according to claim 3, wherein the controller is further programmed to indicate a height of a vessel's rearmost end or a frame's rearmost end of the dump truck as the one of the rotating radiuses of the interference scopes on the composite overhead view image.

5. The surrounding monitoring device for the slewing-type work machine according to claim 4, further comprising a wireless communication member that receives information for identifying a kind of the dump truck from different kinds of dump trucks by wireless communication, wherein the controller is further programmed to indicate the height of the vessel's rearmost end or the frame's rearmost end corresponding to one of the kinds of dump trucks as the one of the rotating radiuses of the interference scopes on the composite overhead view image.

6. The surrounding monitoring device for slewing-type work machine according to claim 1, wherein the controller is further programmed to indicate numeric data of the ground height of the rotating radiuses of the interference scopes on the composite overhead view image.

7. The surrounding monitoring device for the slewing-type work machine according to claim 1, wherein, in case where there exists a difference of height between positions of the slewing-type work machine and the obstacle, the controller is further programmed to indicate an adjustment for a displayed position of the rotating radiuses of the interference scopes on the composite overhead view image displayed on the monitor depending upon the difference of height.

8. The surrounding monitoring device for slewing-type work machine according to claim 1, wherein, in case where the height of the obstacle is changed, the controller is further programmed to indicate a width between an upper limit rotating radius interference scope and a lower limit rotating radius interference scope as a difference in height.

* * * * *